(12) United States Patent
Brumfield

(10) Patent No.: US 11,049,181 B2
(45) Date of Patent: Jun. 29, 2021

(54) DATA FEED WITHOUT QUANTITIES

(75) Inventor: Harris C. Brumfield, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 1024 days.

(21) Appl. No.: 13/012,474

(22) Filed: Jan. 24, 2011

(65) Prior Publication Data

US 2012/0191587 A1    Jul. 26, 2012

(51) Int. Cl.
*G06Q 40/04* (2012.01)

(52) U.S. Cl.
CPC .................................. *G06Q 40/04* (2013.01)

(58) Field of Classification Search
CPC ........ G06Q 40/04; G06Q 40/06; G06Q 30/08; G06Q 30/0613; G06Q 30/0283
USPC .......................................................... 705/37
See application file for complete search history.

(56) References Cited

U.S. PATENT DOCUMENTS

| 4,903,201 A | 2/1990 | Wagner |
| 6,772,132 B1 | 8/2004 | Kemp, II et al. |
| 7,127,424 B2 | 10/2006 | Kemp, II et al. |
| 7,228,289 B2 | 6/2007 | Brumfield et al. |
| 7,389,258 B2 | 6/2008 | Brumfield et al. |
| 7,389,268 B1 | 6/2008 | Kemp, II et al. |
| 7,424,450 B2 | 9/2008 | Kemp, II et al. |
| 7,539,640 B2 | 5/2009 | Burns et al. |
| 7,587,357 B1 | 9/2009 | Buck |
| 7,747,513 B2 | 6/2010 | Duquette et al. |
| 7,752,115 B2 | 7/2010 | Schluetter et al. |
| 7,805,360 B2 | 9/2010 | Sundaram et al. |
| 8,108,297 B2 | 1/2012 | Schluetter |
| 2002/0052822 A1 | 5/2002 | Terashima |
| 2005/0240510 A1 | 10/2005 | Schweickert et al. |
| 2006/0259406 A1 | 11/2006 | Kemp, II et al. |
| 2006/0265316 A1 | 11/2006 | Brumfield et al. |
| 2008/0010221 A1 | 1/2008 | Co et al. |
| 2008/0027855 A1* | 1/2008 | Hirani et al. .................... 705/37 |
| 2008/0046356 A1 | 2/2008 | Farrell et al. |
| 2008/0086408 A1 | 4/2008 | Johnson et al. |
| 2008/0275806 A1* | 11/2008 | Raitsev et al. ................... 705/37 |
| 2009/0076946 A1 | 3/2009 | Kelly et al. |
| 2009/0089071 A1 | 4/2009 | Doornebos et al. |
| 2009/0259598 A1 | 10/2009 | Stevens et al. |
| 2009/0265282 A1 | 10/2009 | Noviello |

(Continued)

FOREIGN PATENT DOCUMENTS

| JP | 2002-149981 A | 5/2002 |
| JP | 2002-203112 A | 7/2002 |

(Continued)

OTHER PUBLICATIONS

International Search Report and Written Opinion for Int. App. No. PCT/US2012/021435, dated Jun. 7, 2012.

(Continued)

*Primary Examiner* — Bennett M Sigmond
*Assistant Examiner* — Michael D Cranford

(57) ABSTRACT

The present embodiments relate to an improved data feed. In an embodiment, an electronic exchange, when generating a data feed, in particular a price data feed, purposefully chooses to include the inside market and/or last traded price but purposefully leaves out the market depth. The market depth may be omitted to provide an optimal marketplace.

5 Claims, 8 Drawing Sheets

(56) References Cited

U.S. PATENT DOCUMENTS

| | | |
|---|---|---|
| 2010/0228644 A1 | 9/2010 | Schluetter |
| 2010/0241588 A1 | 9/2010 | Busby |
| 2010/0274705 A1 | 10/2010 | Schwarz et al. |

FOREIGN PATENT DOCUMENTS

| | | |
|---|---|---|
| JP | 2006-513506 A | 4/2006 |
| JP | 2006-515697 A | 6/2006 |
| JP | 2007-188487 A | 7/2007 |
| JP | 2011-518396 A | 6/2011 |
| WO | 2004/053657 A2 | 6/2004 |
| WO | 2004/068272 A2 | 8/2004 |
| WO | 2007/075620 A2 | 7/2007 |
| WO | 2009/131943 A2 | 10/2009 |

OTHER PUBLICATIONS

BIDS Trading Solutions Web Page[online], , BIDS Holding, L.P., n.d. [Retrieved on Dec. 16, 2010] from the Internet: http://www.bidstrading.com/solutions/solutions-overview/.

Bogoslaw, D., "Big Traders Dive Into Dark Pools: The Alternative Trading Systems are Luring Big Institutional Customers by Offering Greater Privacy and Lower Costs. Their Growth Could Affect Big Exchanges," *BusinessWeek*, Oct. 3, 2007, 2 pgs. [Retrieved on Nov. 30, 2010] from the Internet: http://www.businessweek.com/investor/content/oct2007/pi2007102_394204.htm.

Dark Liquidity Web Page [online], Wikipedia, The Free Encyclopedia, n.d. [Retrieved on Dec. 16, 2010] from the Internet: http://en.wikipedia.org/wiki/Dark_liquidity.

Dark Pools of Liquidity Web Page [online], Wikipedia, The Free Encyclopedia, n.d. (last modified: Oct. 18, 2010) [Retrieved on Nov. 4, 2011] from the Internet: http://web.archive.org/web/20101023144308/http://en.wikipedia.org/wiki/Dark_pools.

DayTradeSports' Sports Picks & Sports Handicapping Web Page [online], Daytradesports.com, n.d. [Retrieved on Dec. 16, 2010] from the Internet: http://www.daytradesports.com/.

Intrade Prediction Markets Web Page [online], Intrade, n.d. [Retrieved on Dec. 16, 2010] from the Internet: http://www.intrade.com/.

"Questions About Dark Pool Trading? ITG has Answers" Flyer [online], Investment Technology Group, 2008. [Retrieved on Dec. 16, 2010] from the Internet: http://www.itg.com/darkpool/ITGhasanswers.pdf.

SmartPool FAQs Web Page[online], SmartPool Trading Limited, n.d. [Retrieved on Dec. 16, 2010] from the Internet: http://www.tradeonsmartpool.com/AboutUs/FAQs/.

Sportsbook Review Odds Point Spread Web Page [online], SBR Marketing Ltd., n.d. [Retrieved on Dec. 16, 2010] from the Internet: http://odds.sbrforum.com/#/odds/nfl/game/pointspread.html.

Tiefenbrun, N., "What are 'Dark Pools' for?" [online], *Turquoise Talks*, Turquoise—London Stock Exchange Group, May 26, 2010. [Retrieved on Dec. 16, 2010] from the Internet: http://tradeturquoise.blogspot.com/2010/06/what-are-dark-pools-for.html.

Schmerken, Ivy. "CME Expands Views of Order Book Data," Information Week Wall Street and Technology, Mar. 26, 2009. Retrieved from the Internet at http://www.wallstreetandtech.com/exchanges/cme-expands-views-of-order-book-data/d/d-id/1261587 on Oct. 5, 2015.

Bid-ask spread article, Wikipedia, published Nov. 21, 2010. Retrieved from the Internet on Dec. 14, 2017 at: https://en.wikipedia.org/w/index.php?title=Bid%E2%80%93ask_spread&oldid=398078568.

Spread definition, Investopedia, published Jan. 21, 2011, as per Wayback Machine. Retrieved from the Internet on Dec. 14, 2017 at: https://web.archive.org/web/20110121025300/https://www.investopedia.com/terms/s/spread.asp.

Muranaga, Jyun, "Dynamic Study on the liquidity of the stock market," a discussion paper of the Institute for Monetary and Economic Studies (IMES), Bank of Japan, issued Dec. 26, 2000, p. 5.

\* cited by examiner

DATA FEED WITHOUT QUANTITIES

BACKGROUND

The present patent document relates to an electronic trading system.

An electronic trading system generally includes an electronic exchange that publishes a data feed to subscribing client devices. A data feed is a series of one or more messages that include data that is related to a market for a tradeable object. For example, a data feed may include, among other things, an inside market, market depth, last traded price, and a last traded quantity. The inside market is the lowest available ask price (best offer) and the highest available bid price (best bid) in the market for a particular tradable object at a particular point in time. Market depth in this document refers to quantities available at the inside market and at other prices away from the inside market. The last traded price (LTP) is a price at which the tradeable object was last traded. The last traded quantity (LTQ) is a quantity that last traded.

Responding to the trading community's desire for more information, the amount of data included in a data feed has continually increased over time. In general, market participants believe that a data feed should include as much data about a market as possible. In an attempt to accommodate the desire for more data, electronic exchanges have continued placing more and more data into the data feed. As technology has advanced, these data feeds, even with the increased amount of data, have become more comprehensive, quicker, and more reliable.

BRIEF DESCRIPTION OF THE DRAWINGS

Example embodiments are described herein with reference to the following drawings.

Figure 1:
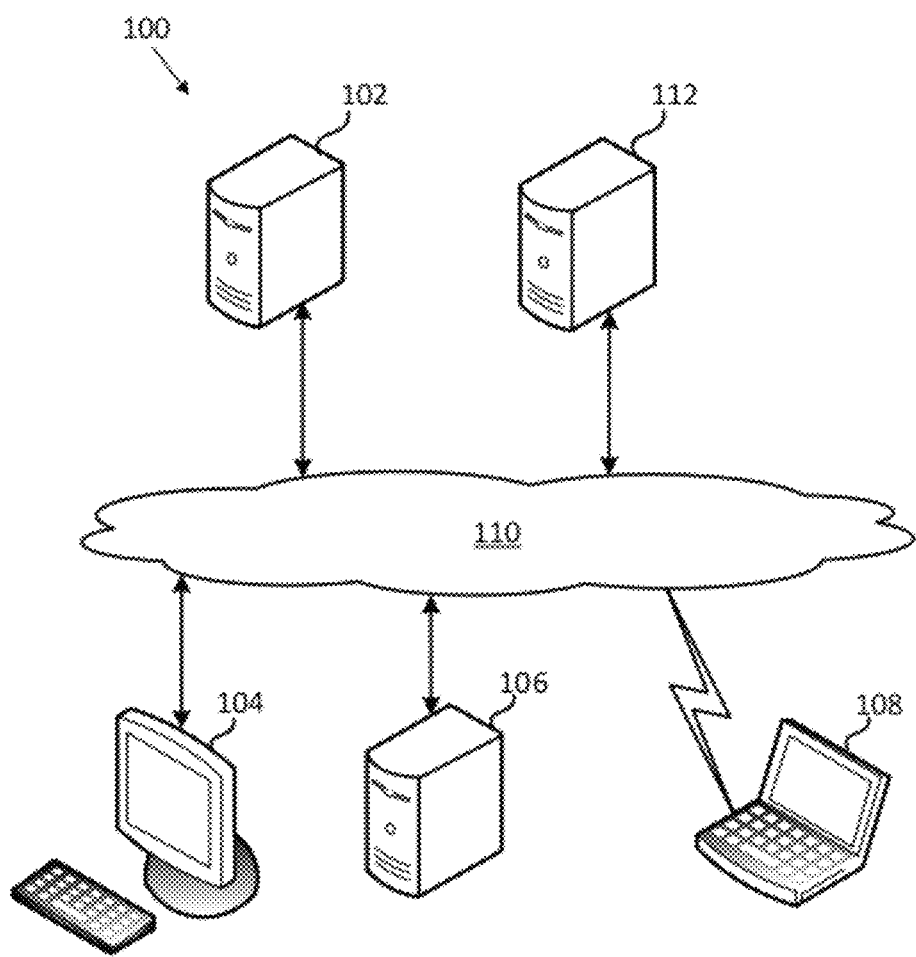
FIG. 1 is a diagram illustrating an example embodiment of an electronic trading system including an electronic exchange and client devices.

The following detailed description will be better understood when read in conjunction with the drawings which show certain example embodiments. The drawings are for the purpose of illustrating certain embodiments, but it is understood that the inventions are not limited to the arrangements and instrumentality shown in the drawings.

DETAILED DESCRIPTION

Overview

The present embodiments relate to a data feed that departs from the general belief that more data is better and instead focuses on providing a more optimal marketplace.

In an embodiment, a data feed includes the inside market, but does not include the market depth. Providing the inside market allows market participants to trade using the best bid and best offer. A data feed with the inside market may be optimal because it allows market participants to coordinate among different markets and transfer liquidity among tradeable objects. Markets are interconnected. Providing the inside market allows market participants to coordinate among these markets. However, without the market depth, the data feed attempts to provide an optimal marketplace by leveling the playing field for market participants by protecting market integrity. For example, intentionally leaving out market depth may potentially reduce the bandwidth requirement necessary for the data feed, reduce market manipulation, and prevent market participants from using the data feed to identify another market participant's trading strategy or identity. Protecting market integrity may increase liquidity in the market because market participants will have greater confidence in the market.

In another embodiment, a data feed includes an inside market and last traded price, but does not include market depth. Consequently, in addition to the best bid and offer, market participants may trade using the last traded price data. The last traded price allows a market participant to determine the price at which the last trade was completed. This information may be used to further understand where a trade order is likely to be matched.

In yet another embodiment, a data feed includes a last traded price, but does not include the inside market or market depth. The last traded price allows a market participant to approximate where the inside market is located based on historical data. Although it does not provide the current best bid or best offer, the last traded price does allow a market participant to intentionally place trade orders that are at or near the inside market.

Reference herein to "embodiment" means that a feature, structure, or characteristic described in connection with the embodiment can be included in at least one embodiment of the invention. The appearance of this phrase in various places in the specification is not necessarily all referring to the same or single embodiment or even different and mutually exclusive embodiments. In addition, separate or alternative embodiments are not mutually exclusive embodiments. Instead, the embodiments described herein, explicitly and implicitly understood by one skilled in the art, may be combined with other embodiments. The embodiments and combinations thereof are all within the scope of this patent document.

Description of an Electronic Trading System

FIG. 1 illustrates a diagram of an electronic trading system 100 that includes an electronic exchange host system (hereinafter, "electronic exchange") 102 and client devices 104, 106, 108. The client devices 104, 106, 108 connect to the electronic exchange 102 via a network 110. The electronic trading system 100 may also include a gateway 112.

The electronic trading system 100 may include additional, different, or fewer components and/or networks. For example, client devices 104, 106, 108 may connect to additional electronic exchanges that are not shown. In another example, more or less client devices may connect to the electronic exchange 102. Unless specifically stated, the following description and claims should not be limited to the arrangements and instrumentality shown in FIG. 1.

a. Electronic Exchange

The electronic exchange 102 is a computing system that facilitates electronic trading. Electronic trading involves the buying or selling of tradeable objects. The electronic exchange 102 may be implemented with one or more computing devices, such as personal computers, routers, gateways, and servers, at the electronic exchange 102. The processing and/or data storage discussed below may be performed using a single computing device or spread across multiple computing devices.

The electronic exchange 102 may be owned, operated, controlled, programmed, configured, or otherwise used by an exchange, such as the Chicago Mercantile Exchange (CME) or other now known or later formed Exchange. CME's GLOBEX® trading system is an example of an electronic exchange. Although existing electronic exchanges, such as CME's GLOBEX® trading system, do not currently provide a data feed in accordance with an embodiment described herein, they can be modified to do so.

Figure 2:
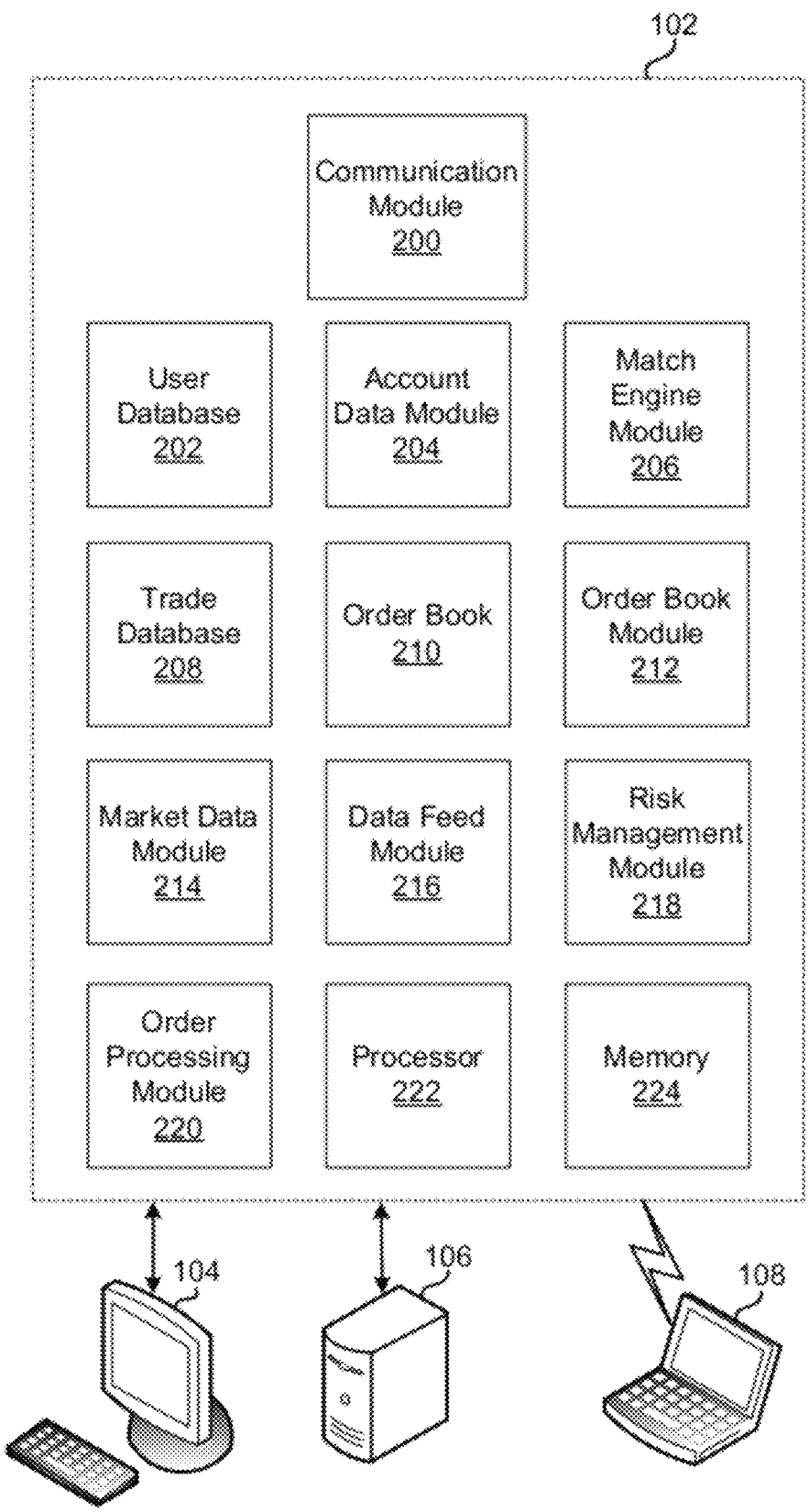
FIG. 2 is a diagram illustrating an example embodiment of an electronic exchange.

FIG. 2 is a diagram that illustrates an example of the electronic exchange 102. FIG. 2 is provided for the purpose of illustrating certain embodiments. It is understood that the inventions are not limited to the arrangements and instrumentality shown in FIG. 2. For example, additional, different, or fewer instruments (e.g., electrical components, databases, modules) may be provided.

FIG. 2 illustrates various databases and modules that may be stored in the electronic exchange 102. A database is an organized collection of data that may be stored in memory and accessed by a processor. A module is a set of one or more computer-readable instructions that may be stored in memory and executed by a processor to perform a specific action. The storage or execution of one or more of the databases and modules may be distributed among one or more computing device at the electronic exchange 102.

The electronic exchange 102 includes a communication module 200. The communication module 200 is used for communication with one or more of the client devices 104, 106, 108. Communication may include transmitting and/or receiving messages. For example, the communication module 200 may provides one or more data feeds to subscribing client devices 104, 106, 108. The communication module 200 may configure the data feed in accordance with a proprietary binary format (e.g., unique to an exchange), the Financial Information Exchange (FIX) protocol, or other now known or later developed format.

The communication module 200 may also receive messages that include trade orders from one or more of the client devices 104, 106, 108. A trade order may be an order to buy or sell a tradeable object at a particular price, an order to change or cancel a previously submitted order (e.g., a working order), or other instruction for an electronic exchange. A tradeable object is any object that can be traded. Financial products such as stocks, options, bonds, futures, currency, interest rates, warrants, funds, derivatives, securities, commodities, traded events, goods, index-based products, and collections and/or combinations of these are some of the objects that can be traded. By way of example, the E-mini Standard and Poor's 500 futures contract is a tradeable object that is bought and sold electronically through the CME's GLOBEX® trading system. Such a trade order can also be traded through the electronic exchange 102.

A user database 202 includes account data. Account data is data related to market participants and other users of the electronic exchange 102. For example, user names, passwords, and other data that identifies market participants uniquely or collectively may be stored in the user database 202. Other data related to market participants, such as risk limits, participant's status (e.g., status as a market maker), or other data related to the market participants, may also be stored in the user database 202. The account data module 204 processes account data before, during, and after electronic trading, such that the account data may be used for electronic trading purposes.

A match engine module 206 matches bids and offers. For example, match engine module 206 may be executed to perform one or more matching algorithms for matching contra-side bids and offers. Exemplary matching algorithms include a "first in, first out" ("FIFO") algorithm, a pro-rata algorithm, an allocation algorithm, and a hybrid price/time priority algorithm. The matching algorithm may match outright orders or implied orders. A FIFO algorithm matches orders based on a price and time priority. A first order at a price level is the first order matched. Orders may lose their priority and get re-queued if users increase the quantity, change the price, or change the account number, for example.

A trade database 208 includes data relating to trades and descriptions of trades. For example, a trade database may store data that identifies the time that a trade took place and a contract price for a particular market participant. Generally, the trade database 208 includes data relating to trades that are complete (e.g., already matched).

The electronic exchange 102 includes an exchange order book ("order book") 210. An order book is a database that includes data relating to unmatched quantity of trade orders. For example, the order book 210 may include data relating to a market for a tradeable object, such as the inside market, market depth at various price levels, the last traded price, and the last traded quantity. In addition to being used by the match engine module 206 to match contra-side bids and offers, the order book 210 may be used when generating one or more data feeds that are sent to the client devices 104, 106, 108. A sell order is contra-side to a buy order with the same price. Similarly, a buy order is contra-side to a sell order with the same price.

An order book module 212 manages the order book 210. Managing the order book 210 may include updating the order book 210. Updating the order book 210 may include adding, removing, or changing orders listed in the order book 210. The order book 210 may be updated periodically (e.g., every 3 milliseconds) or when a certain event occurs. For example, the order book 210 may be updated each time a message that includes a trade order is received at the electronic exchange 102. Alternatively, or additionally, the order book 210 may be updated when contra-side bid and offer are matched.

A market data module 214 obtains market data from the order book 210. For example, using the order book 210, the market data module 214 may compute or otherwise determine the inside market, market depth at various price levels, the last traded price, the last traded quantity, or a combination thereof. In another example, using the trade database 208, the market data module 214 obtains data about specific trade orders or market participants, such as data related to completed trades. In yet another example, the market data module 214 may generate market data related to outright orders and/or implied orders. As such, the present embodiments may be applied to either outfights or implieds. Market data module 214 may provide the market data to a data feed module 216 included in the electronic exchange 102.

The data feed module 216 may generate one or more data feeds. A data feed is a series of one or more messages that includes data related to a market for a tradeable object. Different types of data feeds, such as a price data feed, order data feed, fill data feed, or any other now known or later developed data feed may be generated. A conventional price data feed includes at least the inside market, market depth, last traded price, and last traded quantity. The data in the price data feed is not specific to a particular market participant. As such, the price data feed may be provided to a plurality of market participants, whether or not these market participants are related. A price data feed may be modified in accordance with an embodiment.

A conventional order data feed includes data relating to various orders at an electronic exchange. For example, the order data feed may include an acknowledgement that an order was received. A fill data feed includes data relating to completed (e.g., filled) orders. The order data feed and fill data feed may include data that is specific to a market participant. As such, the order data feed and fill data feed may be provided to individual market participants. A combination of these data feeds may be combined together. Furthermore, these data feeds may be modified in accordance with an embodiment.

In an embodiment, the data feed module 216 generates a data feed that includes the inside market, but does not include the market depth. According to this embodiment, market participants may trade using the inside market. Market direction must be judged from other sources, for example, instead of using the market depth. For example, market direction may be judged from market fundamentals, data relating to a market participant's completed orders, news, and other tradeable object prices. The data feed provides a more fair and optimal marketplace because the electronic exchange provides the inside market but purposefully leaves out the market depth. As such, the data feed attempts to strike an optimal balance of providing market data and protecting market integrity, as will be discussed in more detail below.

In another embodiment, a data feed includes an inside market and last traded price, but does not include market depth. As a result, market participants may trade using inside market and last traded price data. However, in an embodiment, the market depth is intentionally left out of the data feed. In another embodiment, the market depth is included in the data feed but is masked, such that market participants are unable to obtain the market depth.

In yet another embodiment, a data feed includes a last traded price, but does not include the inside market or market depth. In this embodiment, market participants may trade using the last traded price data. The last traded price allows a market participant to approximate where the inside market is currently located.

In some embodiments, the communication module 200 may compress a data feed prior to transmitting the data feed to the subscribing client devices 104, 106, 108. Compressing a data feed may include various types of compression used to reduce the size of the data feed. Compression removes data from the data feed that can be reconstructed at the client devices. Compression techniques may send only enough data for the client devices to re-create the original data feed.

The communication module 200 may transmit a data feed to one or more client devices. Generally, a data feed is transmitted using multicast channels or yet some other transmission method, such as unicast. Multicast communication is based on a group concept, where a group of subscribers, such as a group of client devices, express an interest in receiving a particular data stream (defined by a multicast group address) from a source. For example, a price data feed may be transmitted using multicast communication. Unicast communication involves sending data over a network from a single sender to a single receiver. The order data feed and/or fill data feed may be sent using unicast communication, for example.

The risk management module 218 computes or otherwise determines a user's risk utilization in relation to the user-defined risk thresholds. An order processing module 220 decomposes variable defined derivative products and aggregates order types for processing by the match engine module 206 and the order book module 212.

As shown in FIG. 2, the electronic exchange 102 includes a processor 222 and a memory 224. The processor 222 provides overall control for the electronic exchange 102. The processor 222 may be a general processor, digital signal processor, application specific integrated circuit, field programmable gate array, analog circuit, digital circuit, programmed processor, combinations thereof, or other now known or later developed processing device. Although shown as a single device, the processor 222 may be a combination of computing devices, such as a series of servers that are in communication with each other. The processor 222 is responsive to computer readable instructions stored in the memory 224.

The memory 224 is computer-readable storage media. Computer-readable storage media includes various types of volatile and non-volatile storage media. Examples of computer-readable storage media include but are not limited to a random access memory, a read-only memory, and a hard disk drive. The memory 224 may be configured to store data that may be accessed by the processor 222. For example, the memory 224 is configured to store the databases and modules 202-220 illustrated in FIG. 2. The processor 222 is configured to access the data stored in the databases and execute (e.g., perform) the modules.

b. Client Devices

Returning to FIG. 1, client devices 104, 106, 108 are computing devices (e.g., including a processor and memory) that facilitate electronic trading. Examples of client devices include personal computers, gateways, and servers. As shown in FIG. 1, the client device 104 is a desktop computer, client device 106 is a server-side device that is configured for automated trading and is collocated with the electronic exchange 102, and client device 108 is a mobile computer that is connected to the electronic exchange 102 via at least one wireless connection (e.g., illustrated as a lightning bolt in FIG. 1).

A client device may be owned, operated, controlled, programmed, configured, or otherwise used by a market participant. A market participant is a trader (e.g., a human) or a group of (e.g., more than one) traders. A group of traders may use the same account number or have another association with each other. For example, a group of traders may have the same multicast group address. Client devices 104, 106, 108 of FIG. 1 may be owned, operated, controlled, programmed, configured, or otherwise used by the same market participant or different market participants.

A client device communicates with the electronic exchange 102 via the network 110. For example, a trading application running on a client device may receive one or more data feeds from an electronic exchange 102. The trading application may process the one or more data feeds and display data from the one or more data feeds on a display device. If the data feed does not include certain data, the trading application is unable to display that data. For example, unless the data feed includes the market depth or other data that can be used to determine the market depth, the trading application is unable to display market depth on the display device.

c. Network

Network 110 is a network configured for communication. As such, the network 110 may include one or more communication networks that connect the various components shown in FIG. 1. The network 110 may include a variety of direct or indirect connections. For example, the network 110 may include a direct connection, such as a T1 connection, or indirect connections via one or more intermediary components, such as high-speed servers, routers, gateways, and so on. The network 110 may be a packet-based network, such as the Internet. However, any type of network configuration can be used in accordance with an embodiment.

d. Gateway

The gateway 112 communicates with one or more of the client devices 104, 106, 108 and the electronic exchange 102 and may facilitate communication between these devices and systems. For example, the gateway 112 may receive a message that includes a trade order from a client device and transmit the message to the electronic exchange 102. As another example, the gateway 112 may receive a data feed from the electronic exchange 102 and transmit the data feed to one or more of the client devices 104, 106, 108, The gateway 112 is a computing device that is equipped for interfacing networks that use different protocols. For example, the gateway 112 may process a message that includes a trade order received from a client device. The gateway 112 may convert the message into a format accepted by the exchange 102. Similarly, the gateway 112 may transform a data feed that is in an exchange-specific format into a format understood by a client device. The gateway 112 may also perform other actions. For example, the gateway 120 may coalesce market data from one or more exchange systems and provide it to the client devices 104, 106, 108.

Data Feed That Focuses on Providing a More Optimal Marketplace

The present embodiments relate to a data feed that departs from the general belief that more data is better and instead seeks to provide a more optimal marketplace by intentionally leaving out market depth. A data feed in accordance with an embodiment may provide a more optimal marketplace relative to a marketplace that uses a conventional data feed that includes market depth. For example, relative to a conventional data feed with market depth, a data feed in accordance with an embodiment may reduce the bandwidth required to deliver the data feed, increase market integrity, unify market participants, ensure coordination of markets is available to market participants, or any combination thereof.

Responding to the trading community's desire for more information, the amount of data included in a data feed has continually increased over time. Market participants generally believe that a data feed should include as much data about a market as possible. In an attempt to accommodate the desire for more data, electronic exchanges have continued placing more and more data into the data feed. The increased loads of the data feeds have effectively increased the bandwidth requirements necessary to distribute the data feeds to the various client devices. In some instances, this has led to insufficient affordable bandwidth and a less-than-optimal marketplace. A data feed without market depth may have a lower bandwidth requirement than a conventional data feed that includes market depth. Accordingly, a marketplace using a data feed in accordance with an embodiment is more optimal than a marketplace using a conventional data feed because the bandwidth requirement is lower.

A data feed in accordance with an embodiment may increase market integrity. In some instances, market participants use market depth to manipulate a market. Manipulating a market may include "flashing." Flashing relates to submitting trade orders (sometimes very large trade orders) away from the inside market without any intention of the orders being filled, which can create a buying or selling market pressure. In response, other market participants will often trade based on this perceived market pressure. However, the market participant(s) that is "flashing" the market will remove the trade orders before they are filled and submit other trade orders to achieve a more desirable price. As a result, market depth may, in some instances, assist market participants with manipulating the markets. Accordingly, a marketplace that uses a data feed without market depth may be more optimal than a marketplace that uses a conventional data feed that has market depth. Without market depth, it may be more difficult for a market participant to attempt to move the market move and as a result more difficult to manipulate the market.

Not only are data feeds with market depth sometimes being used to manipulate markets, they may also be used to determine other market participants' trading strategies. Providing market depth or other data that may be used to determine market depth in a data feed allows market participants to view the trading actions of other market participants, whether they are trading large or small volumes, by tracking market depth. This is not fair for the market participants as a whole. Trading strategies are typically proprietary and should not be revealed to other market participants. Revealing a trading strategy does not change market fundamentals but rather can lead to market manipulation. Accordingly, a marketplace that uses a data feed without market depth may be more optimal than a marketplace that uses a conventional data feed that has market depth because it can be more difficult for a market participant to identify a trading strategy or identity without the market depth. Reducing the possibility of market manipulation may increase liquidity because market participants will have greater confidence in the market and may be encouraged to submit more trade orders. Alternatively, or additionally, a greater number of market participants may be attracted to participate in the market.

A data feed in accordance with an embodiment may unify market participants. Conventional marketplaces, which use conventional data feeds, do not provide a marketplace that unifies market participants. Instead, the conventional data feeds have caused some market participants to begin using other markets when buying or selling tradeable object. For example, in the equities industry, market participants sometimes use dark pools of liquidity when buying or selling tradeable objects. Details about the market are concealed or dark. Dark pools are often formed from brokers' order books and other off-market liquidity. No details about the market are provided to other market participants until after an order has been filled. The market depth of a dark pool cannot be seen by any potential market participant and can be imputed only after a market participant's trade has been completed. For example, if a trade order is filled at a particular price, the market participant may determine that there was market depth at that particular price. Even then, the data about the completed order is generally delayed so as to prevent real-time or near real-time imputed calculations about the market.

Dark pools of liquidity allow market participants to move (e.g., buy or sell) tradeable object without showing their actions to other market participants. Accordingly, market participants wishing to conceal their trading strategy use dark pools as an alternative to other markets and as a result have divided market participants. Market participants are no longer unified in the same market. Accordingly, a marketplace that uses a data feed with the inside market and/or the last traded price but without market depth may be more optimal than a marketplace that does not provide any information about the market because it offers advantages that attract market participants.

A data feed in accordance with an embodiment may ensure that market participants are able to coordinate among multiple (e.g., two or more) markets. Coordinating among multiple markets may include leaning on a tradeable object in the same or a different market. Leaning on other tradeable objects is commonly referred to as hedging. Hedging requires knowing the price that each of the tradeable objects is being quoted, such that a spread price between different tradeable objects (e.g., not a bid-ask spread) may be obtained. Markets that do not provide the inside market, such as dark pools, do not allow a market participant to lean on other tradeable objects because the inside market is unknown. For example, because markets are interconnected (e.g., have an impact on each other), different tradeable objects, such as products and contracts, derive liquidity from each other. Providing an inside market is more precise than a dark pool and in this way allows the transfer of liquidity to take place more effectively. Accordingly, a marketplace that uses a data feed with the inside market and/or the last traded price but does not include the market depth may be more optimal than a marketplace that does not provide any information about the inside market because it allows market participants to coordinate among markets.

Figure 3:
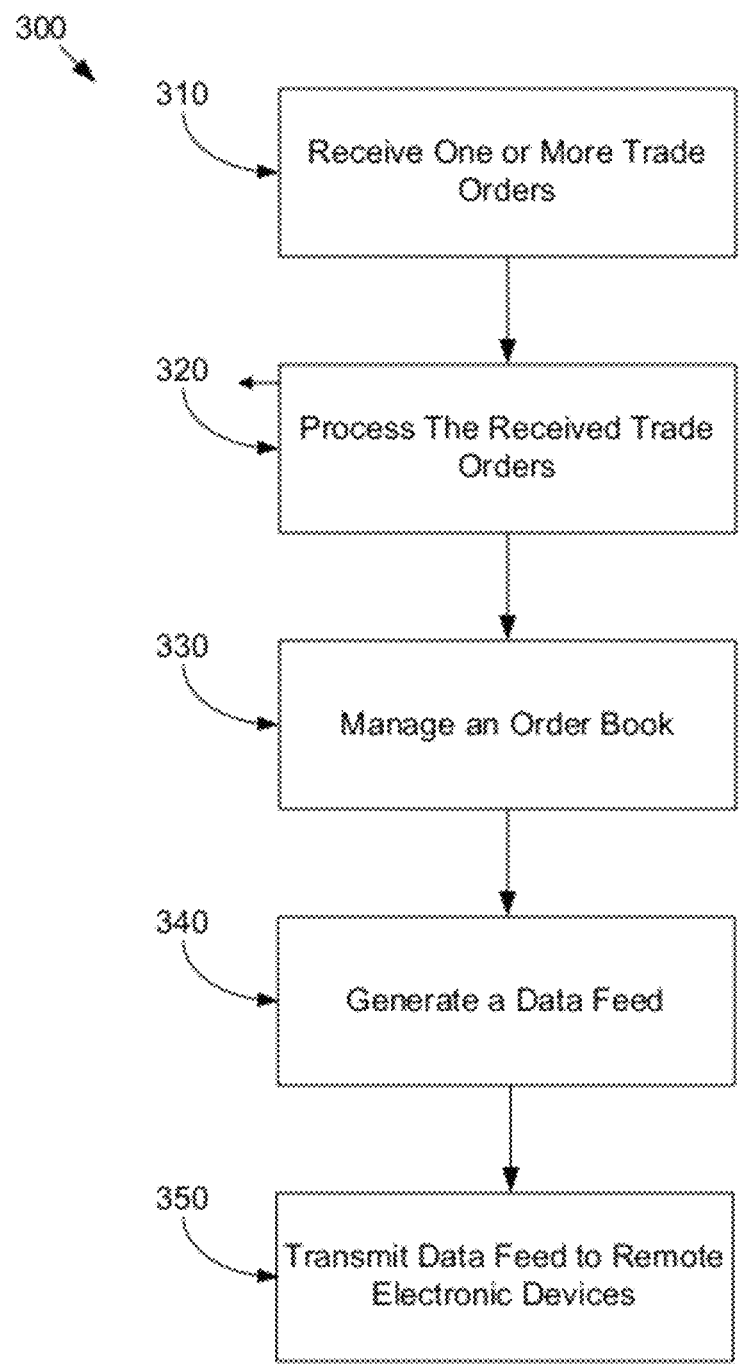
FIG. 3 is a flowchart that illustrates a process of an embodiment.

FIG. 3 illustrates a diagram of a method 300 for providing a data feed in accordance with an embodiment. The method 300 may be implemented by any of an apparatus (e.g., the electronic exchange 102 of FIG. 1), a system, a computer program, a computer readable medium, or a combination thereof. The method 300 may provide a data feed that provides a more fair and optimal marketplace.

With respect to method 300, changes and modifications, such as additional, different, or fewer acts, may be made to the process shown in FIG. 3 without departing from the spirit and scope of certain inventive aspects described herein. For example, the method 300 may include only acts 330-350 or a different combination of acts. Furthermore, the acts shown in FIG. 3 may be performed in the order shown or a different order.

In act 310, a computing device at an electronic exchange, receives one or more messages that include trade orders. These messages are received from one or more remote electronic devices. A remote electronic device may be a client device that subscribes to receive one or more data feeds from an electronic exchange. The one or more messages may be received at various times. For example, the computing device may receive 500 messages/millisecond from a plurality of remote electronic devices. Each of the received messages may include a single trade order or a plurality of trade orders. In the case of a plurality of trade orders, the trade orders may be non-related trade orders (e.g., part of different trading strategies) or related trade orders (e.g., part of the same trading strategy).

In act 320, the computing device at the electronic exchange processes the one or more received messages. Processing may include preparing the trade orders in the messages for matching. Processing may also include attempting to match orders with contra-side orders in the exchange order book or with other received trade orders prior to the trade orders being placed in an exchange order book, as will be discussed below.

In act 330, the computing device at the electronic exchange manages an order book. Managing an order book includes attempting to match contra-side orders in the order book, updating the order book, or the combination thereof. Matching may include using a matching algorithm, such as a "first in, first out" ("FIFO") algorithm, an allocation algorithm, and a hybrid price/time priority algorithm, to match contra-side orders in the order book. Updating may include adding, removing, or changing data in the order book. For example, updating may include adding unmatched orders from act 320 to the order book or removing matched orders.

In act 340, the computing device at the electronic exchange generates a data feed in accordance with an embodiment. In an embodiment, the electronic exchange generates a data feed that includes the inside market, but does not include the market depth. As used herein, the term market depth may include the actual market depth or other data that is intended to be used to determine the actual market depth. Consequently, market participants may trade using the inside market data. The data feed provides a more optimal marketplace because the electronic exchange publishes the inside market to subscribing client devices, but purposefully leaves out the market depth.

Of course it is possible, and even likely, for market participants to use other sources to trade on and not just the inside market, for example, in this embodiment. Also, it may still be possible to reconstruct a market depth using other sources, for example, a third-party that aggregates data and provides a third party data feed. However, the exchange published feed, which should remain neutral to all market participants, seeks to provide a more optimal marketplace by eliminating market depth from the data feed.

Figure 4:
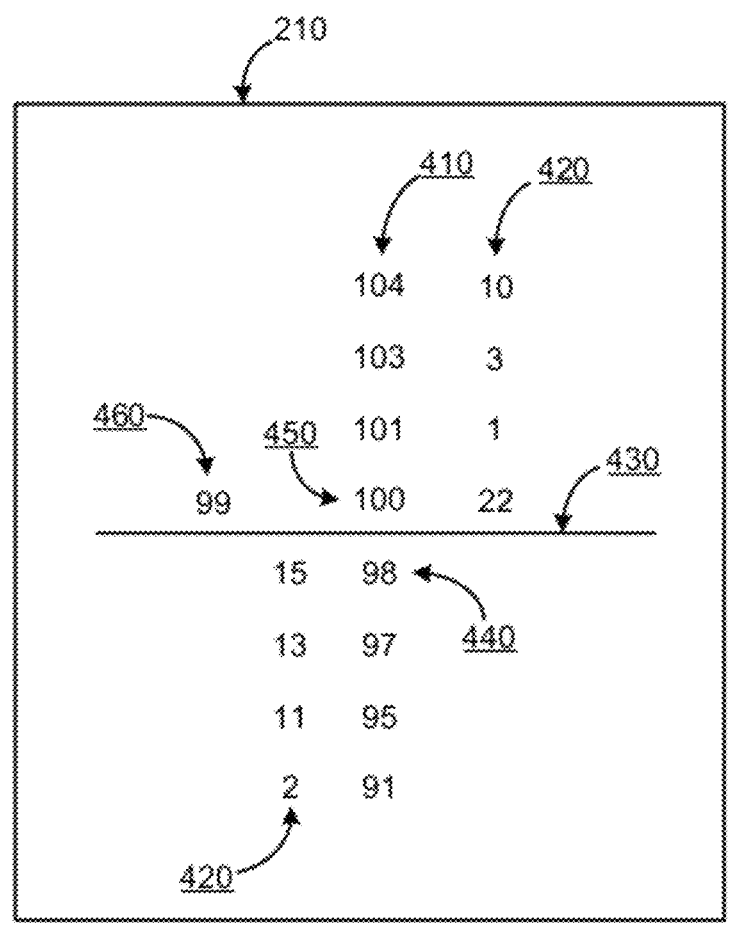
FIG. 4 is a diagram illustrating an example embodiment of an order book.

FIG. 4 illustrates a snapshot in time of an exemplary order book 210 for a tradeable object. In the exemplary illustration of FIG. 4, the order book 210 includes various price levels 410 for which there are existing orders. The quantity 420 of orders at the various price levels, including the inside market and perhaps at other price levels, is commonly referred to as market depth. For example, at this particular point in time, there are "10" unmatched offers to sell at a price of "104." Accordingly, the market depth for the price of "104" is "10." The inside market 430 is the best bid price 440 and the best offer price 450.

In an embodiment, generating includes generating a data feed that includes an inside market but does not include market depth, the last traded price, the last traded quantity, or a combination thereof. For example, using the example shown in FIG. 4, an electronic exchange may generate a data feed that includes the inside market 430, which includes both the best bid price 440 and the best offer price 450, but does not include the market depth 420 for any of the price levels or the last traded price 460.

Figure 5:
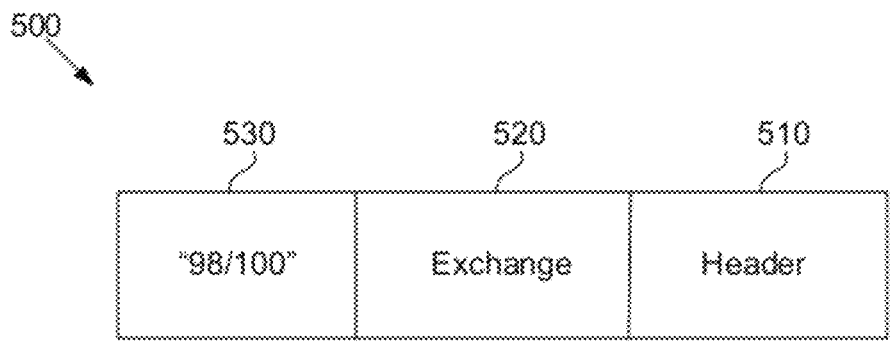
FIGS. 5-9 are diagrams of various example embodiments of data feeds provided from an electronic exchange.

FIG. 5 is an example embodiment of a data feed 500. The data feed 500 includes header data 510, exchange data 520, and inside market data 530. Header data 510 may include data that is used for routing the data feed 500 to one or more remote electronic devices, such as a destination address (e.g., a multicast group address or unicast address). Exchange data 520 may include data related to the originating exchange, such as data relating to a matching algorithm being used to match contra-side trade orders. The inside market data 530 includes the inside market. In this example, the inside market is "98/100." Other information may be included in the data feed 500, as long as the data provides a more fair and optimal marketplace.

In yet another embodiment, generating includes generating a data feed that includes data that can be used to determine the inside market but does not include the market depth, last traded price, and last traded quantity. Data that can be used to determine the inside market may include a derivation of the inside market. A derivation of the inside market is data that can be used to determine the inside market but is not the actual inside market. For example, a derivation of the inside market may be the best bid price (or the best offer price) and a spread between these prices. Using the illustration of FIG. 4, a data feed may include the best bid price 440 and a spread of "+2." This information may be used to determine the inside market, for example, by adding a value of "2" to the best bid price 440 of "98" to obtain the best offer price 450 of "100." Similarly, in some embodiments, the best ask price 450 and a spread of "−2" may also be used. Other data may also be used to determine the actual location of the inside market and may be included in the data feed.

Figure 6:
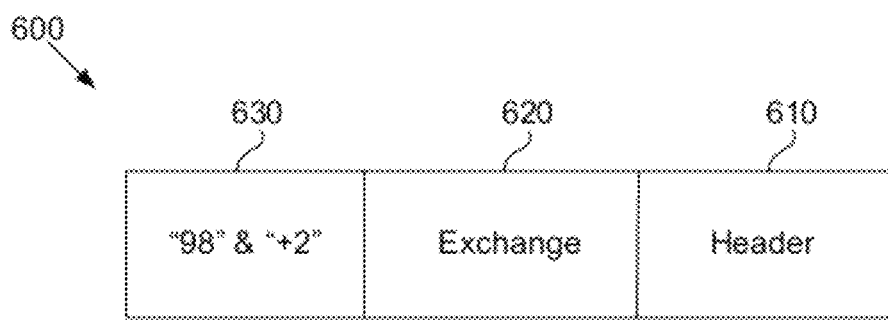

FIG. 6 is an example embodiment of a data feed 600. The header data 610 and exchange data 620 may be similar to or the same as the header data 510 and exchange data 520 of FIG. 5. The inside market data 630 includes the best bid price "98" and the spread "+2" between the best bid price and the best offer price relative to the best bid price. This data may be used to determine that the inside market is "98/100." Alternatively, in an embodiment not shown, the inside market data 630 may include the best offer price "100" and the spread "−2" between the best bid price and the best offer price relative to the best offer price.

The exemplary data feed shown in FIG. 6 may not be as advantageous as the exemplary data feed shown in FIG. 5 because the data feed of FIG. 6 may require additional processing, for example, at the electronic exchange and/or at the remote electronic device. At the electronic exchange, generating the data feed may require calculating the spread between the best bid price and best offer price. Similarly, when processing the data feed, the client device may be required to calculate the inside market by adding or subtracting the spread from the best bid or offer price, depending on which was provided in the data feed. However, in both the examples of FIG. 5 and FIG. 6, the actual inside market may be determined using the inside market data 530, 630.

In yet another embodiment, the computing device at the electronic exchange generates a data feed that includes a last traded price but does not include the inside market and market depth. The last traded price may be used to approximate the location of the inside market. For example, in the illustration of FIG. 4, the last traded price 460 of "99" may be used to accurately approximate the actual inside market 430 because the last traded price 460 is generally at or near the inside market 430. In this illustration, the last traded price 460 is actually between the best bid price 440 and the best offer price 450. This provides an accurate way of approximating the location of the inside market 430. Other data may also be used to approximate the actual location of the inside market and may be included in the data feed, for example, instead of or along with the last traded price.

Figure 7:
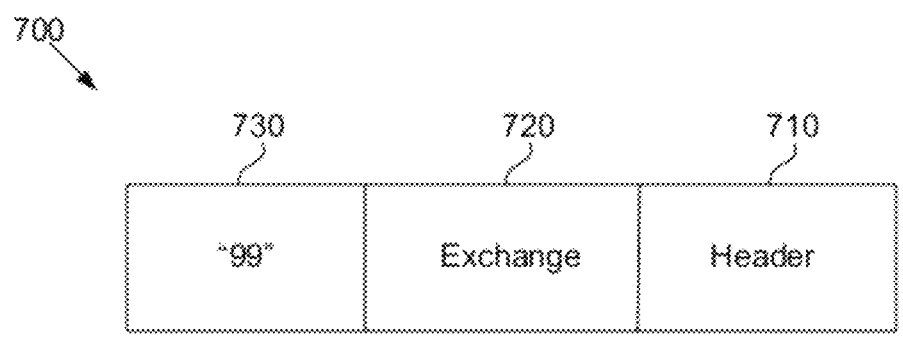

FIG. 7 is another example embodiment of a data feed 700 that includes header data 710, exchange data 720, and inside market data 730. The header data 710 and exchange data 720 may be similar to or the same as the header data 510 and exchange data 520 of FIG. 5. The inside market data 730 includes the last traded price, which in this example is "99." The last traded, when used by the remote electronic devices receiving the data feed 700, may provide an approximation of the inside market, as opposed to the actual inside market. Although this may not be as accurate as providing the inside market data shown in FIGS. 5 and 6, it still allows a market participant to make an approximation of where the market is currently trading.

Although the last traded price may be beneficial, the inside market may be more beneficial than the last traded price because it is a current or near real-time value and not a historical value. The last traded price shows what the inside market was, which is a good indication, however, the inside market may have moved since that point. Accordingly, the inside market is generally more accurate than the last traded price.

In yet another embodiment, the computing device at the electronic exchange generates a data feed that includes an inside market and last traded price, but does not include market depth. For example, using the illustration of FIG. 4, the data feed may include the inside market 430 of "98/100" and the last traded price 460 of "99."

Figure 8:
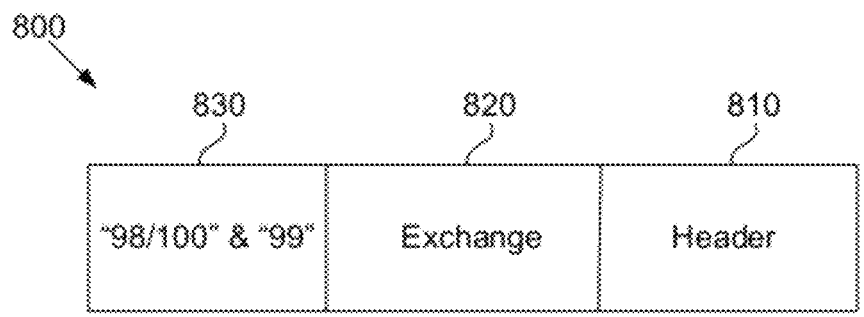

FIG. 8 illustrates an embodiment of a data feed 800. Header data 810 and exchange data 820 may be similar or the same as header data 510 and exchange data 520 of FIG. 5. The inside market data 830 may include the inside market, which in this example is "98/100," and the last traded price, which is "99." The data feed 800 does not include data that may be used to determine a market depth for the inside market.

In yet another embodiment, the computing device at the electronic exchange generates a data feed that includes the last traded price and a spread that associates the inside market and the last traded price. The spread may be used to determine the difference between the last traded price and the inside market or further determine the actual or approximate location of the inside market. For example, using the illustration of FIG. 4, the data feed may include the last traded price 460 of "99" and a spread between both sides of the inside market and the last traded price. For example, the spread may be "+/−1," which indicates that the inside market is "98/100." The spread may actually include two different numbers. For example, the spread may be "+2, −3" indicating that the best offer price is "+2" from the last traded price and the best bid price is "−3" from the last traded price.

Figure 9:
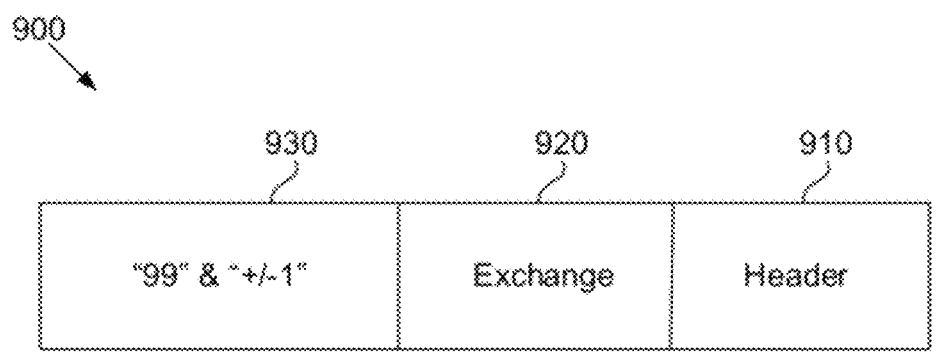

FIG. 9 illustrates an embodiment of a data feed 900. The header data 910 and exchange data 920 may be similar or the same as the header data 510 and exchange data 520 of FIG. 5. The inside market data 930 may include the last traded price of "99" and a spread between the last traded price and the inside market. In this example, the spread is "+/−1."

Turning back to FIG. 3, once the computing device at the electronic exchange generates the data feed, the method 300 may proceed to act 350. In act 350, the computing device at the electronic exchange provides the data feed to the subscribing remote electronic devices. Providing the data feed may include preparing a data feed for transmission and/or transmitting the data feed. Preparing the data feed may include compressing the data feed. Compressing may include reducing the size of the data feed. Transmitting the data feed may include sending, disseminating, publishing, or otherwise making available all or some of the data in the data feed.

As a result of not including the market depth, market participants will not be able to see the market depth unless they attempt to recreate it through other means. Because the data feed includes data that may be used to determine or estimate the price location of the inside market and omits market depth, the data feed may provide a more optimal marketplace.

In an embodiment, a data feed may include market depth; however, the market depth may be unavailable to the market participants. For example, the market depth may be masked or locked (e.g., password protected) or encrypted without the market participants having a way to unlock or decrypt the data. Although this may not reduce bandwidth requirements, this embodiment does still provide a more optimal marketplace because it does not allow market manipulation or detection of a trading strategy based on data in the data feed.

Figure 10A:
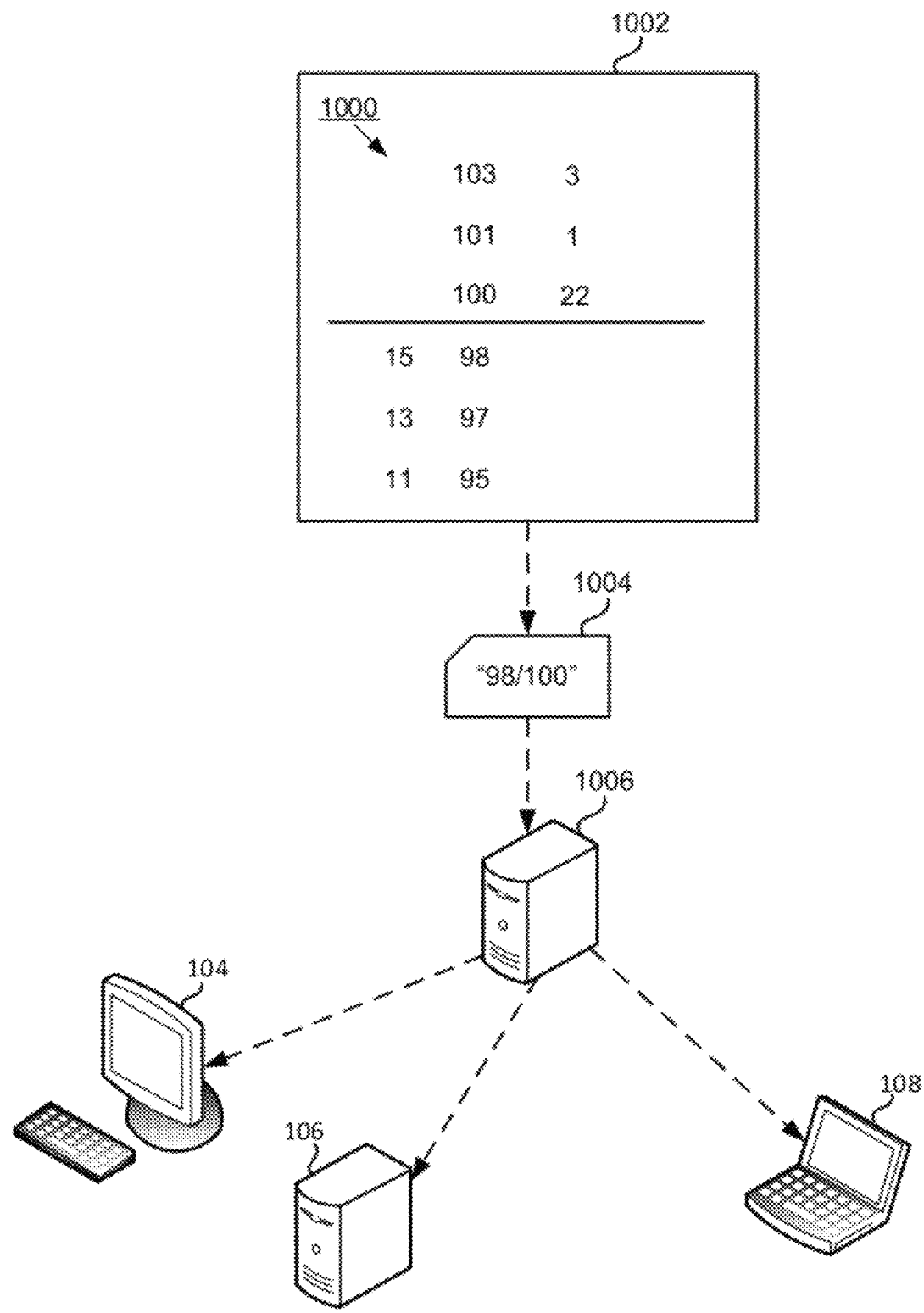
FIGS. 10A and 10B illustrate a dynamically changing market and data feed.
Figure 10B:
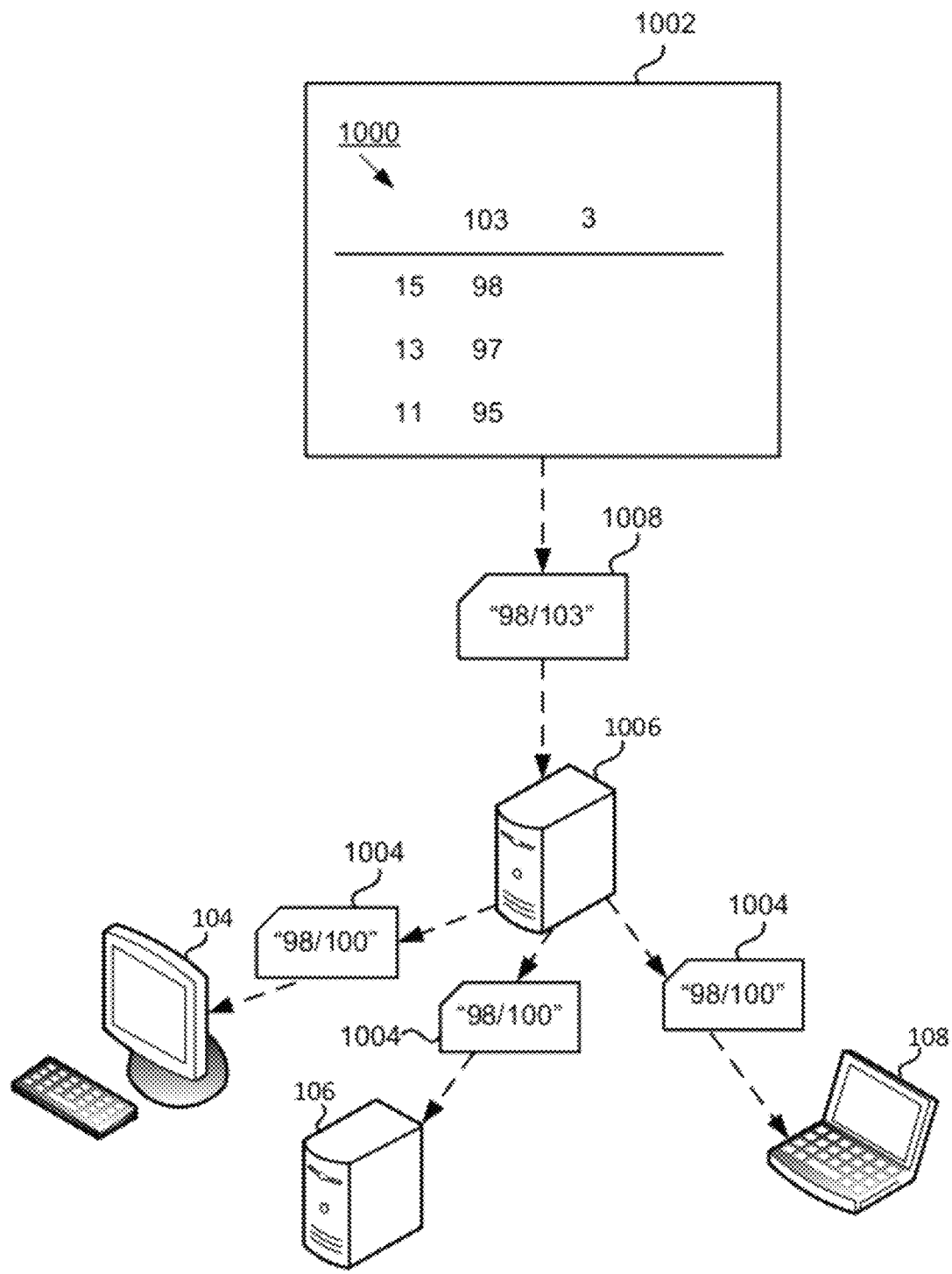

FIGS. 10A and 10B illustrate a dynamically changing market. FIG. 10A illustrates a snapshot in time of an exemplary order book 1000 in an electronic exchange 1002. FIG. 10B illustrates a snapshot of the order book 1000 at a different point in time than that shown in FIG. 10A. The market in FIG. 10A is different than the market shown in FIG. 10B.

In FIGS. 10A and 10B, the client devices 104, 106, 108 may submit trade orders to the electronic exchange 1002. The electronic exchange 1002 may receive the trade orders and place them in the order book 1000. Trade orders may be received at the electronic exchange 1002 at any time.

In FIG. 10A, the electronic exchange 1002 may generate a data feed 1004. The data feed 1004 is a price data feed. The data feed 1004 may include inside market data, for example, as illustrated in FIGS. 5-9 and described above. However, as shown in FIG. 10A, the inside market data may include the actual inside market "98/100" because the best bid is currently "98" and the best offer price is currently "100." Once generated, the electronic exchange 1002 may transmit the data feed 1004 to a price server 1006. The price server 1006 may be included in or operate in conjunction with the electronic exchange 1002.

In FIG. 10B, the price server 1006 receives and processes the data feed 1004 and distributes the data feed 1004 to subscribing client devices 104, 106, 108. According to one example embodiment, processing the data feed 1004 may include sending the data feed 1004 via multicast to a designated multicast group address. In such an embodiment, all client devices, here client devices 104, 106, 108, subscribing to that specific multicast address on the LAN will receive the data feed 1004. A port may be assigned at the client devices 104, 106, 108 to listen to multicast price data. With respect to unicast communication, separate ports could be assigned for receipt of fill data and order data, for example, in a fill data feed, at the client devices. In such an embodiment, a fill server and the order server may send fill and order data to the predetermined ports at the client terminals.

At this point in time, the market has changed. The inside market is not "98/103." The electronic exchange 1002 may generate another data feed 1008 that includes inside market data, for example, as illustrated in FIGS. 5-9 and described above. However, as shown in FIG. 10B, the data feed 1008 may include the new inside market. That is, the inside market of "98/103" may be included in the data feed 1008. The price server 1006 may again receive and distribute the data feed 1008 to the subscribing client devices 104, 106, 108.

In an embodiment, the electronic exchange has access to the inside market, market depth, last traded price, and last traded quantity. The electronic exchange, when generating a data feed, such as an exchange provided data feed, purposefully chooses to include the inside market and/or last traded price. However, the electronic exchange purposefully leaves out the market depth, even though this information may be known by the electronic exchange.

In another embodiment, a method comprises receiving, using a computing device at an electronic exchange, order messages from a plurality of remote electronic devices. Each order message includes a trade order to buy or sell a quantity of a tradeable object for a particular price. The method also includes processing, using the computing device, the order messages and determining a best bid price, quantity of bids at the best bid price, a best ask price, and quantity of asks at the best ask price. Processing includes attempting to match trade orders and entering unmatched trade orders in an electronic order book. Providing using the computing device, a price message that includes the best bid price and the best ask price to the client devices being used by the market participants. Processing may include sending, disseminating, or publishing. The price message does not include the quantity of bids at the best bid price and the quantity of asks at the best ask price to prevent, for example, the price message from being used to determine how the prices will move.

In yet another embodiment, a method for balancing transparency of an electronic market for a tradeable object and privacy of market participants that are participating in the electronic market is provided. The method includes managing, using a computing device at an electronic exchange, an electronic order book with trade orders received from client devices. The order book includes information related to a best bid price, a best offer price, and market depth. The method also includes constructing, using the computing device, a price feed that includes a best bid price and a best ask price but does not include quantity at either the best bid price or best ask price. The best bid price and best ask price are included to ensure that the market participants are aware of an inside market and the quantity at the best bid and ask price is omitted to ensure, for example, that the privacy of the market participants is protected. The computing device may send the price feed to the client devices.

In yet another embodiment, a method for providing a more fair and optimal marketplace includes processing, using a computing device at an electronic exchange, an electronic order book that includes trade orders received from client devices. The electronic order book includes information related to a best bid price, a best offer price, and market depth for a tradeable object market. The method also includes configuring, using the computing device, a data feed such that the data feed includes the best bid price and the best offer price but does not include market depth. Configuring the data feed may include generating, determining, and constructing the data feed. The market depth is omitted to prevent the market depth from being used to determine how prices will move. The computing device may send the data feed to the client devices.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. A method comprising:
   receiving, by a match engine at an electronic exchange, an order message from a remote electronic device specifying a trade order for a quantity of a tradeable object at a price;

processing, by the match engine, the received order to identify a match for the received order;

receiving, by a gateway in communication with the electronic exchange, a market data feed generated by the match engine according to a first data format, wherein the market data feed includes a plurality of matches at a plurality of prices for a plurality of tradeable objects;

extracting, by the gateway, a lowest available offer price and a highest available bid for each of the plurality of tradeable objects in the received market data feed;

generating, by the gateway, a data feed according to a second data format based on each of the extracted lowest available offer price and the highest available bid as a price spread for each of the plurality of tradeable objects, wherein the second data format of the generated data feed includes a plurality of market data feeds each having the generated price spread for one of a plurality of tradeable objects; and multicasting, by the gateway, the generated data feed to a plurality of remote electronic devices in communication with the gateway.

2. The method of claim 1, wherein the highest available bid is a best bid price for the tradeable object and the lowest available offer price and is a best offer price for the tradeable object and comprises an inside market for the tradeable object.

3. The method of claim 2, wherein the market data feed further comprises a last traded price for each of the plurality of tradeable objects.

4. The method of claim 2, wherein the remote electronic devices that receive the data feed do not receive the inside market from the electronic exchange.

5. The method of claim 4, wherein the remote devices that receive the data feed estimate the market depth based on data that is not in the data feed.

* * * * *